United States Patent
Joshi

(10) Patent No.: US 11,295,753 B2
(45) Date of Patent: Apr. 5, 2022

(54) SPEECH QUALITY UNDER HEAVY NOISE CONDITIONS IN HANDS-FREE COMMUNICATION

(71) Applicant: Continental Automotive Systems, Inc., Auburn Hills, MI (US)

(72) Inventor: Bijal Joshi, Elk Grove Village, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 336 days.

(21) Appl. No.: 14/636,562

(22) Filed: Mar. 3, 2015

(65) Prior Publication Data

US 2016/0260440 A1    Sep. 8, 2016

(51) Int. Cl.
| | |
|---|---|
| *G10L 21/00* | (2013.01) |
| *G10L 21/0264* | (2013.01) |
| *G10L 21/0208* | (2013.01) |
| *H04M 1/60* | (2006.01) |
| *G10L 19/04* | (2013.01) |
| *H04R 3/00* | (2006.01) |
| *G10L 25/12* | (2013.01) |
| *G10L 19/005* | (2013.01) |

(52) U.S. Cl.
CPC .......... *G10L 21/0264* (2013.01); *G10L 19/04* (2013.01); *G10L 21/0208* (2013.01); *H04M 1/6091* (2013.01); *G10L 19/005* (2013.01); *G10L 25/12* (2013.01); *H04R 3/00* (2013.01); *H04R 2499/13* (2013.01)

(58) Field of Classification Search
CPC combination set(s) only.
See application file for complete search history.

(56) References Cited

U.S. PATENT DOCUMENTS

| | | | |
|---|---|---|---|
| 5,930,749 A | 7/1999 | Maes | |
| 6,122,607 A | 9/2000 | Ekudden et al. | |
| 6,487,529 B1 | 11/2002 | Miet | |
| 2008/0032663 A1* | 2/2008 | Doyle | H04H 20/106 |
| | | | 455/345 |
| 2009/0192792 A1 | 7/2009 | Lee et al. | |
| 2013/0282373 A1* | 10/2013 | Visser | G10L 21/0208 |
| | | | 704/233 |

(Continued)

FOREIGN PATENT DOCUMENTS

| | | |
|---|---|---|
| CN | 1215490 A | 4/1999 |
| CN | 1263426 A | 8/2000 |

(Continued)

OTHER PUBLICATIONS

Search Report dated Oct. 20, 2015, from corresponding GB Patent Application No. GB1507253.1.

(Continued)

*Primary Examiner* — Vu B Hang

(57) ABSTRACT

When the noise in an audio signal made up of both speech and noise is suppressed, the quality of the speech in the audio signal is usually degraded. The speech obtained from a noise-suppressed audio signal is improved by determining linear predictive coding (LPC) characteristics of the audio signal without or prior to noise suppression and by determining the LPC characteristics of the noise-suppressed audio. The convolution of those differing characteristics provides an improved-quality speech signal, with the original noise level reduced or suppressed.

13 Claims, 4 Drawing Sheets

(56) References Cited

U.S. PATENT DOCUMENTS

2014/0365212 A1* 12/2014 Konchitsky ............ H04R 3/005
                                                                                    704/219

FOREIGN PATENT DOCUMENTS

| CN | 1424712 A | 6/2003 |
| CN | 1757060 A | 4/2006 |
| CN | 103440871 A | 12/2013 |
| GB | 2466671 A | 7/2010 |
| WO | 2009/096717 A2 | 8/2009 |

OTHER PUBLICATIONS

Tsoukalas, Dionysis E. et al., "Speech Enhancement Based on Audible Noise Suppression", IEEE Transactions on Speech and Audio Processing, vol. 5, No. 6, Nov. 1997.
Ortega-Garcia, Javier et al., "Overview of Speech Enhancement Techniques for Automatic Speaker Recognition", Dept. de Ingenieria Audiovisual y Comunicaciones, Universidad de Madrid, Madrid, Spain.
Rabiner, L.R. et al., "Digital Processing of Speech Signals", Prentice Hall Processing Series, Englewood Cliffs, NJ, 1978.

* cited by examiner

SPEECH QUALITY UNDER HEAVY NOISE CONDITIONS IN HANDS-FREE COMMUNICATION

BACKGROUND

The intelligibility of speech produced from a loudspeaker in a motor vehicle or automobile and the intelligibility of speech detected by a microphone in such an environment is reduced by the several noise sources that accompany a moving vehicle, examples of which include road noise, wind noise and engine noise. While there are prior art noise suppression algorithms that estimate and reduce noise from speech, they also tend to suppress at least some of the speech and thus degrade its fidelity. More particularly, prior art noise suppression techniques reduce the audibility of identifying characteristics of vowels, consonants and other sounds from which speech is formed. A method and apparatus for improving or restoring voice or speech fidelity or speech quality after noise accompanying the speech is suppressed would be an improvement over the prior art.

DETAILED DESCRIPTION

As used herein, "speech quality" refers to identifying characteristics of sounds, e.g., vowel sounds and/or consonant sounds, which are determined chiefly by the resonance of the vocal chambers uttering them. Speech quality is considered to be good when identifying characteristics of vowels and consonants are clearly audible, i.e., heard or capable of being heard. Speech quality is considered to be poor when those same characteristics become inaudible, i.e., not audible or their audibility is reduce. Speech quality is improved when the identifying characteristics of vowels, consonants and other sounds are improved or made more audible.

The audibility of speech can be improved by suppressing noise that tends to mask identifying characteristics. Masking noise, however, typically masks at least some of the identifying characteristics of sound. Stated another way, masking noise tends to degrade speech quality. Restoring the identifying characteristics of vowel sounds and consonant sounds improves the quality of speech after noise is suppressed.

Figure 1:
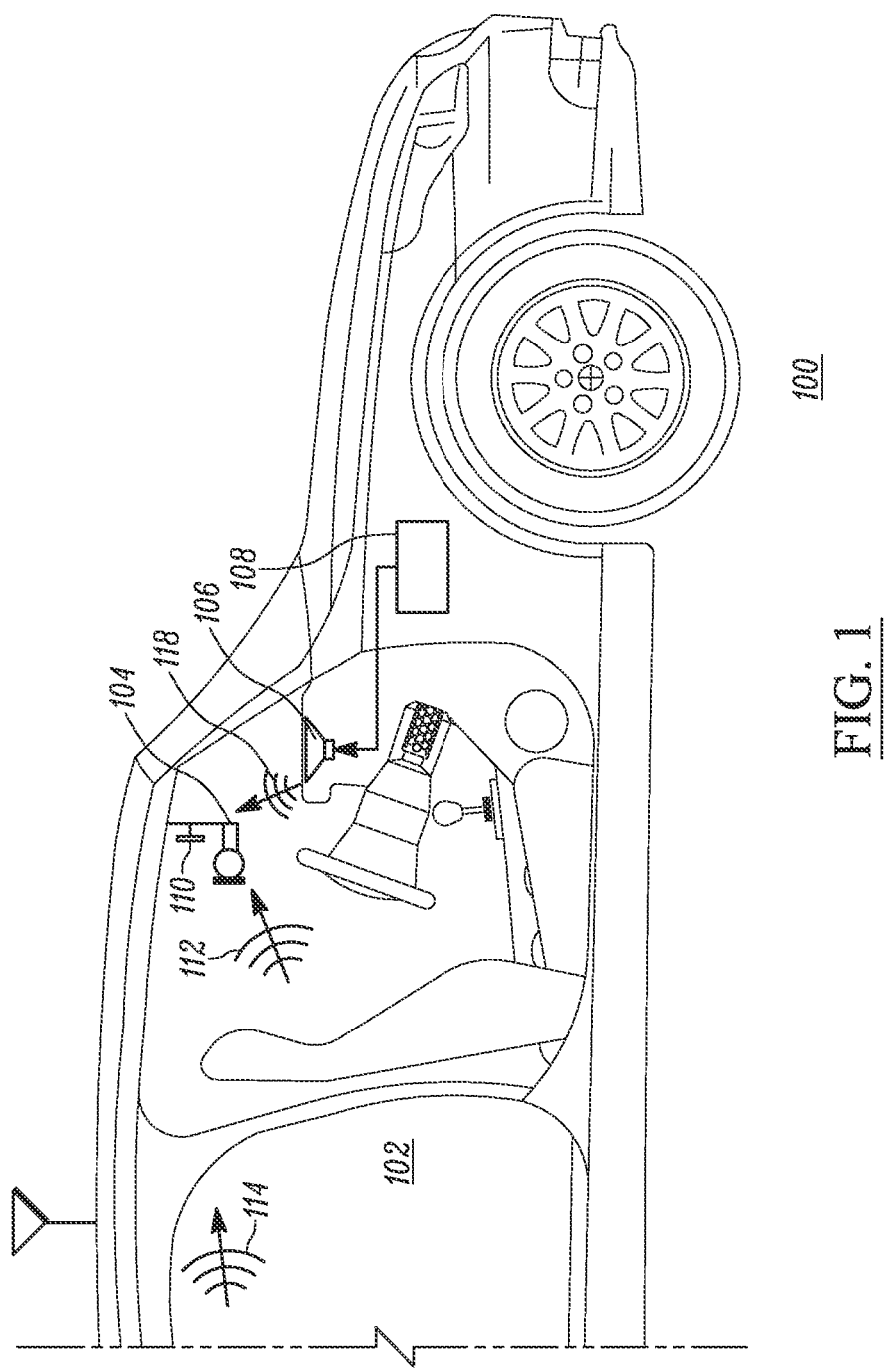
FIG. 1 is a side view of the interior of a motor vehicle provided with a "hands-free" audio system.

FIG. 1 depicts a motor vehicle 100 the passenger compartment 102 or "interior" of which is provided with a microphone 104 and a speaker 106. The microphone 104 and speaker 106 are both coupled to a conventional cellular telephone 108. The microphone 104 and speaker 106 comprise part of a "hands-free" audio system for the cellular telephone 108.

The microphone 104 is depicted as being mounted to the rear view mirror 110 but it can be located anywhere in the vehicle 100 as long as it is able to detect of audio signals from a driver or other occupant. Locating the microphone so that it can detect speech 112 from vehicle occupants virtually anywhere in the vehicle 100, however, causes background noise 114 to be detected inside the passenger compartment 102.

As used herein, background noise includes at least wind noise, road noise and engine noise. By virtue of the location of the microphone 104, it transduces sound waves into audio frequency electrical signals that comprise both speech and background noise. The electrical signals output from the microphone 104 thus represent the speech and noise.

Referring now to the loudspeaker 106, it transduces electrical signals 116 from the cell phone 108 into audible sound waves 118. The sound waves 118 from the loudspeaker are projected into the interior 102 of the vehicle 100 where they are "mixed" with the aforementioned background noise 114.

Background noise 114 in a motor vehicle is virtually impossible to prevent or eliminate. It is therefore important to suppress the background noise 114 after it is picked up by the microphone 104 but before it reaches the far end of a connection provided by the cellular telephone 108.

Figure 2:
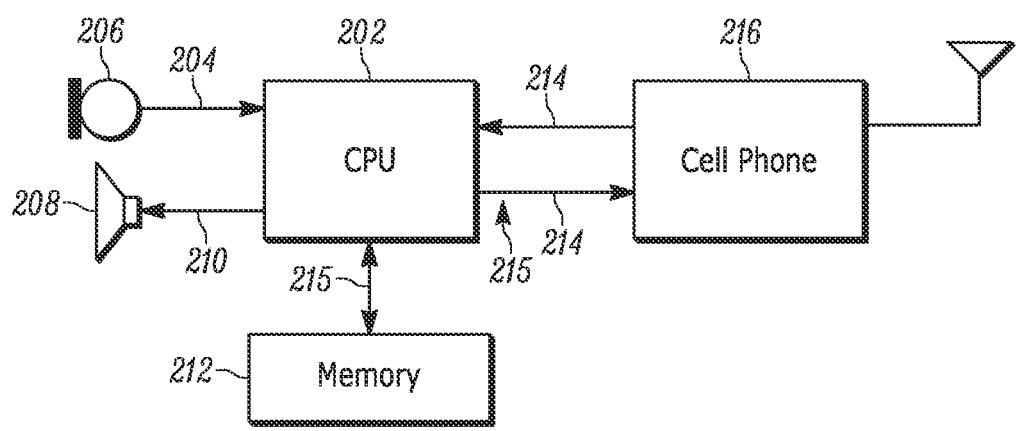
FIG. 2 is a block diagram of an apparatus for improving the quality of speech that is obtained from an audio signal comprising speech and noise together.

FIG. 2 is a block diagram of an apparatus 200 for suppressing background noise in an automotive environment and for improving speech quality after the background noise is suppressed. The apparatus 200 comprises a conventional processor 202 coupled to a non-transitory memory device 212, which stores executable instructions for the processor 202.

The processor receives time-domain audio signals 204 from a conventional microphone 206, an example of which includes the microphone portion of a hands-free audio system. The microphone 206 is located inside the passenger compartment of a motor vehicle, such as the passenger compartment 102 shown in FIG. 1.

In addition to receiving signals from a microphone 206, the processor 202 also provides or "outputs" time domain audio frequency signals 210 to a conventional loud speaker 208 from which intelligible audio can be heard by occupants of the motor vehicle. The audio signals 210, which are analog or time domain, are generated by the processor 202 from frequency-domain signals responsive to program instructions that the processor 202 executes and which cause the processor 202 to process audio signals 214 received from a conventional cell phone 216. Those instructions are stored in the non-transitory memory device 212 coupled to the processor 202 through a conventional bus 215, which is well known as a set of electrically parallel conductors in a computer system and that form a main transmission path for the computer system.

The processor 202 and the instructions it obtains from the memory 212 and executes essentially acts as an interface between the microphone 206 and cell phone 216, which is also coupled to the processor through the same bus 215. The processor 202 and the program instructions it executes thus provide an electronic mechanism that receives audio signals from the microphone 206, processes those signals to suppress noise and produce "noise-reduced" audio signals, re-processes the noise-reduced audio signals to produce an improved-quality speech and provides the improved-quality speech to the cell phone 216. The cell phone 216 modulates the improved-quality speech onto a radio frequency signal.

Figure 3:
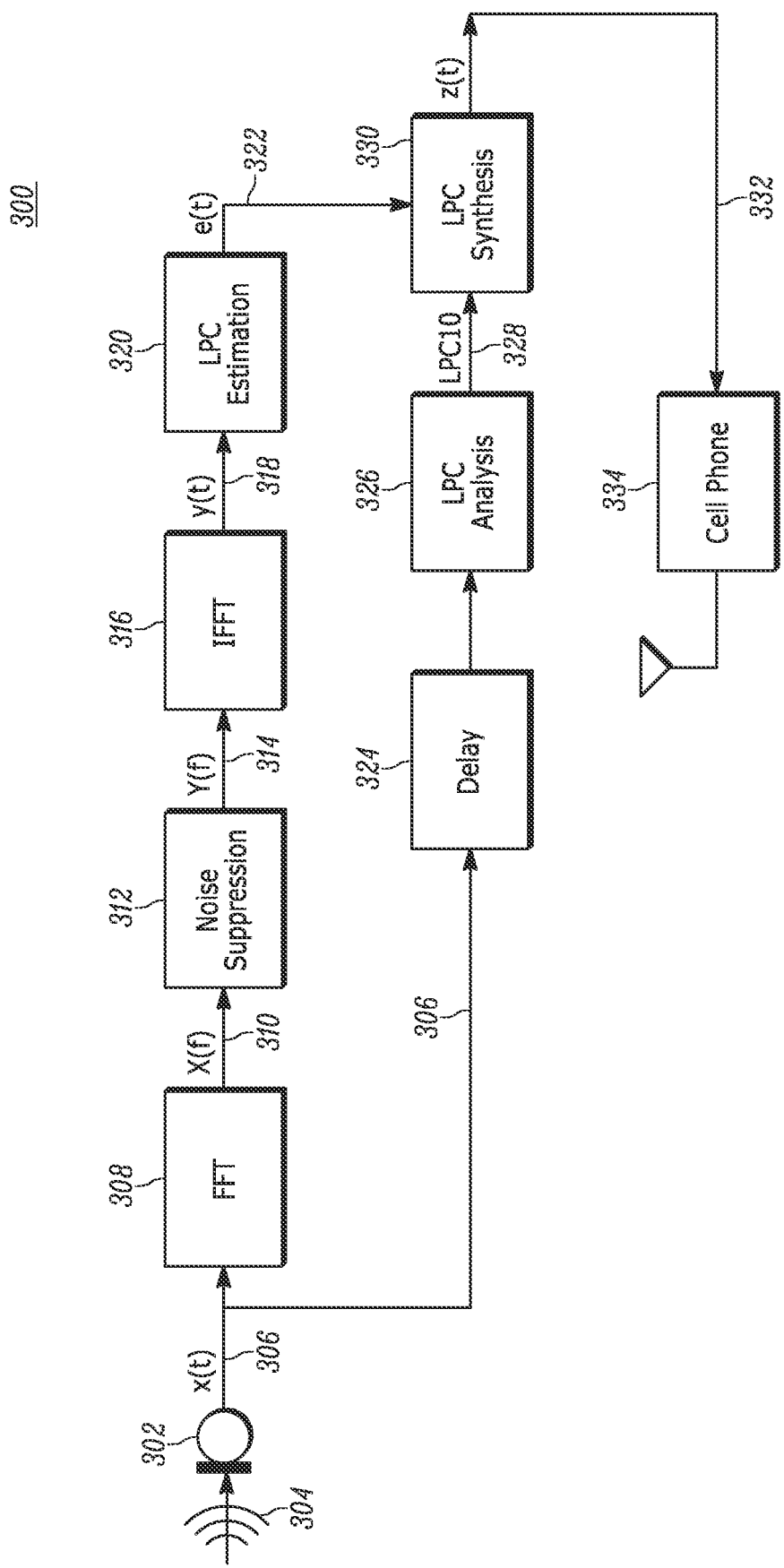
FIG. 3 depicts both method steps and an apparatus for improving the quality of speech in an audio signal made up of both speech and noise.

Referring now to FIG. 3, as it is drawn it depicts both electrical components and steps of a method for improving speech quality in an audio signal, such as the audio signal from the microphone shown in FIGS. 1 and 2, and which comprises both speech and noise, after noise in the audio signal is suppressed. In FIG. 3, the apparatus comprises a microphone 302 which receives an audio signal 304. The audio signal 304 comprises both speech and background noise. The background noise is not white noise but is instead one or more of wind noise, road noise and engine noise.

The time-domain audio signal 306 output from the microphone 306 is provided to a conventional Fast Fourier Transform (FFT) calculator 308, the output signal 310 of which is a series of coefficients, each of which represents a frequency component of samples of the audio signals 306. The output signals 310 from the FFT calculator are provided to a noise suppressor 312 that processes the frequency-domain output 310 of the FFT calculator to provide a noise-reduced output audio signal 314, which is also in the frequency domain. The output 314 of the noise suppressor 312 is provided to an inverse Fast Fourier Transform (IFFT) convertor 316. The output 318 of the IFFT 316 is a time domain representation of the audio signal 306 received from the microphone 302 but with reduced noise and a degraded speech quality. The output 318 is thus a noise reduced but slightly distorted version or copy of the speech component of the audio signal 304 that is received by the microphone 302.

The elements and processes of performing a Fast Fourier Transform, suppressing noise in the frequency domain representation of the audio signal 306 using FFTs and converting that noise-suppressed signal back to the time domain by an inverse Fourier transform 316 is disclosed in applicant's co-pending patent application Ser. No. 13/012,062 entitled "Method and Apparatus for Masking Wind Noise," filed Jan. 24, 2011, the content of which is incorporated herein by reference in its entirety. See also Applicant's co-pending patent application Ser. No. 14/074,495 filed Nov. 7, 2013, entitled "Speech Probability Presence Modifier Improving Log-MMSE Based Noise Suppression Performance,", the content of which is also incorporated herein in its entirety and see application Ser. No. 14/074,423 filed Nov. 7, 2013, entitled "Accurate Forward SNR Estimation Based on MMSE Speech Probability Presence,", the content of which is also incorporated herein in its entirety.

Linear Predictive Coding or "LPC" is well known. It starts with an assumption that a speech signal is produced by a buzzer at the end of a tube with occasional added hissing and popping sounds known as sibilants and plosive sounds. The temporal space between vocal folds produces a buzz, which is characterized by an intensity or loudness and a frequency or pitch. The vocal tract (the throat and mouth) forms the tube, which is characterized by its resonances, give rise to "formants" which are frequency bands in the sound produced. Hisses and pops are generated by the action of the tongue, lips and throat during sibilants and plosives.

LPC analyzes a speech signal by estimating formants, removing their effects from the speech signal, and estimating the intensity and frequency of the remaining buzz. The process of removing the formants is called inverse filtering, and the remaining signal after the subtraction of the filtered modeled signal is called the residue. The numbers which describe the intensity and frequency of the buzz, the formants, and the residue signal, can be stored or transmitted somewhere else. Speech can be synthesized by reversing the process: using the buzz parameters and the residue to create a source signal, using the formants to create a filter which represents the tube, and running the source through the filter, resulting in speech.

Because speech signals vary with time, the process of LPC coding and speech synthesis is done on short chunks of a speech signal referred to as frames. They are generally greater than 50 frames per second and at such a rate they can produce intelligible speech.

Still referring to FIG. 3, linear predictive coding (LPC) is performed by a linear predictive coding estimator 320 on the noise suppressed audio signal 318 that is output from the inverse Fast Fourier Transform convertor 316. Linear predictive coding or "LPC" coefficients derived by the LPC estimator step 320 comprise an error signal 322.

Referring again to the microphone 302, its output signal 306 is provided to an LPC analyzer 326 through a delay line or buffer 324. The LPC analyzer 326 generates linear predictive coding coefficients from the original input signal 306, i.e., the speech and background noise as "heard" by the microphone 302, and outputs several (at least ten) LPC coefficients 328 to an LPC synthesizer 330. The LPC coefficients represent essentially the original audio signal 304, i.e., the speech and the background noise that is suppressed from the error signal 322.

The delay line 324 insures that the time required to generate LPC coefficients 328 output from the LPC analyzer 326 are time synchronized with the LPC coefficients provided by the LPC estimator 320. The delay line 324 thus performs a frame synchronization due to the fact that the steps and structure identified by reference numerals 308-316 are performed on discreet frames of data representing the time domain signal 306 output from the microphone 302, typically about fifty frames per second.

The coefficients 328 outputs from the LPC analyzer 326 are "applied to" the error signal 322 using conventional prior art convolution in the LPC synthesizer 330. The LPC synthesis of the error signal 322 using the coefficients 328 produces a time domain signal 332 which is provided as an input to the cell phone 334. The cell phone 332 modulates the improved-quality speech signal 332 onto a carrier for transmission to a receiver.

Speech that is reconstructed from LPC coefficients derived from the original input signal 306 and the LPC coefficients from a noise or partially noise suppressed signal 322 has been found to have an improved or superior tonal quality over and above the speech output from the inverse Fast Fourier transform convertor 316 by itself. The audibility of the various identifying characteristics of vowels, consonants and other speech sounds is increased.

Figure 4:
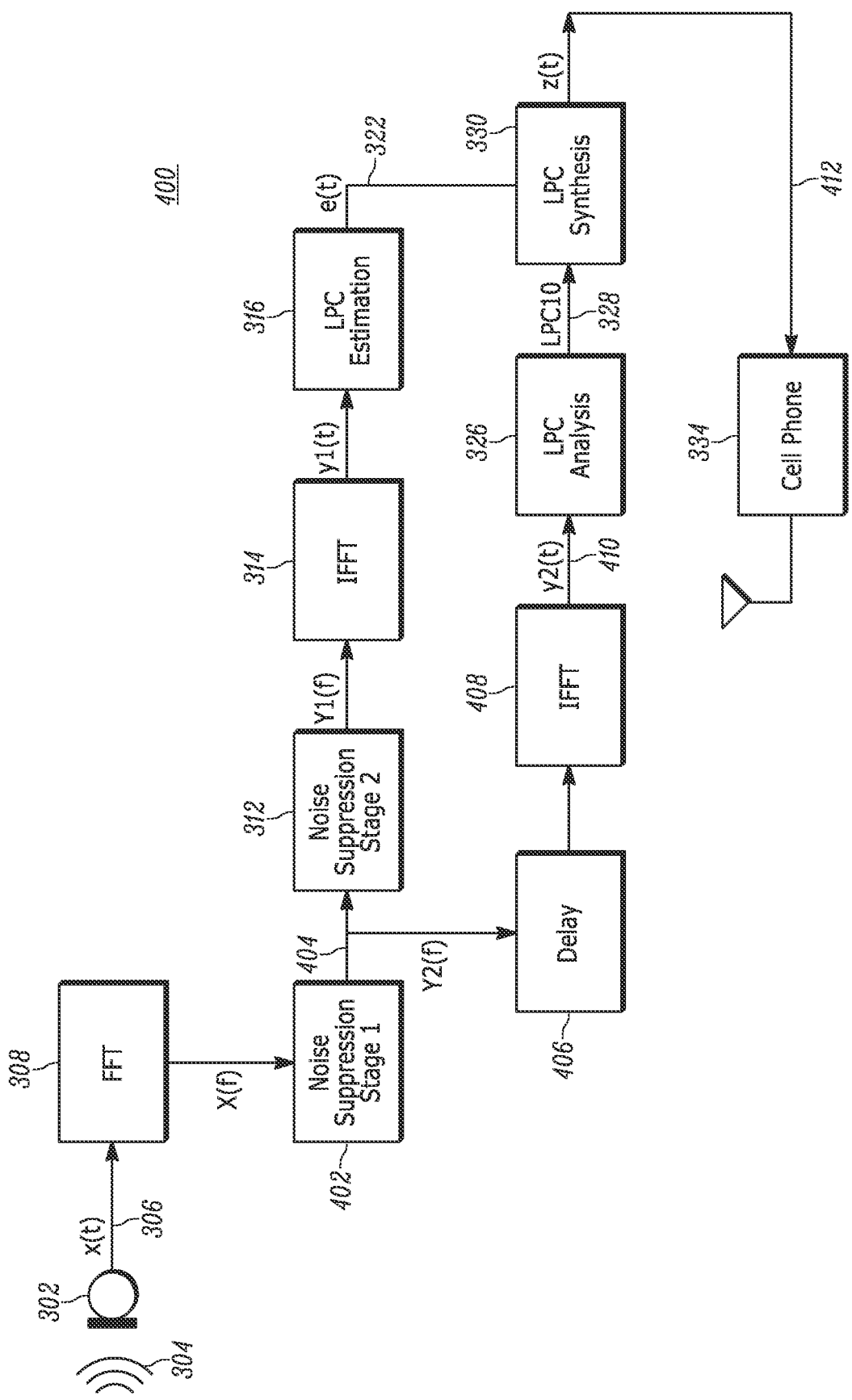
FIG. 4 is an alternate embodiment of both an apparatus and method for improving speech quality in an audio signal comprising speech and noise.

FIG. 4 shows a slightly modified but nevertheless alternate embodiment of the apparatus and method shown in FIG. 3. In FIG. 4, the microphone 302 shown in FIG. 3 has its output signal 306 provided to an additional FFT calculator 308. The frequency domain signals 310 output from the FFT calculator 308 are coefficients of frequency components representing speech and noise in the audio signal received by the microphone. Those coefficients, are provided to a first partial noise suppressor 402. The output of the first noise suppressor 402 is a frequency domain signal 404 the noise level of which is at least partially suppressed to improve at least partially, the speech quality of the audio signal 304 received by the microphone 302. A second noise suppressor 312 an inverse Fast Fourier transform convertor 314 and LPC coefficient estimator 316 are described above and depicted in FIG. 3. Further description of them is therefore omitted for brevity.

Unlike the circuits shown in FIG. 3, the frequency domain signals output from the first noise suppressor 402 are provided to a delay line 406 prior to being provided to a second inverse Fast Fourier transform convertor 408. The time domain signals 410 outputs from the second inverse Fast Fourier transform convertor 408 are provided to the LPC analyzer 326 described above and shown in FIG. 3.

LPC coefficients 328 output from the LPC analyzer 306 are provided to an LPC synthesizer described above and depicted in FIG. 3, the output of which is an improved-quality speech signal 412 that is provided to a cell phone 334 as an audio input modulation signal.

Similar to the embodiment shown in FIG. 3, reconstructing speech from an audio signal 304 comprising speech and noise using LPC coefficients derived from partially processed speech 404 and an error signal 322 has been found to produce a speech signal the quality or fidelity of which is superior to that which is obtained from simply a noise suppressed version of the audio signal. The audibility of identifying characteristics of vowels, consonants and other sounds is increased.

Those of ordinary skill in the electrical arts know that functions and operations performed by a processor can also be implemented using digital logic gates and sequential logic devices. Changing or modifying the operation of a processor, however, is far less costly than changing a hardwired circuit.

Referring again to FIG. 2, the processor 202, can be either a general purpose microprocessor, microcontroller or digital signal processor. It is depicted as being coupled to a non-transitory memory device 212 through a bus 215. The processor 202 executes program instructions stored in the memory device 212. Those instructions cause the processor 202 to perform the operations described above. More particularly, the processor 202 receives a time-domain audio signal 204 comprising speech and noise at an analog input port commonly found on many microprocessors, microcontrollers and digital signal processors.

The stored program instructions cause the processor to calculate an FFT of the incoming audio signal 204, suppress noise in the frequency-domain using the aforementioned noise-suppression technique, estimate LPC coefficients for both the noise-suppressed signal and produce a "clean" audio signal 204 received from the microphone 206. A "clean" output signal is represented by the output signal identified by reference numeral 318 in FIG. 3.

Convolution is a well-known process. Instructions stored in the memory device 212 cause the processor 202 to "convolve" the LPC coefficients for the filtered audio and unfiltered or "clean" audio, the result of which is a reconstruction of the original speech without artifacts or distortion caused by noise suppression. The processor 202 and the instructions stored in the memory device 212 thus comprise a noise suppressor, a linear predictive coding (LPC) analyzer, which itself comprises an LPC estimator and an error signal generator. The improved-quality speech 210 is provided to a loudspeaker or other form of audio signal transducer that generates audible sound waves from audio-frequency electrical signals.

In the preferred embodiment, audio signals 214 from the microphone 206 and audio signals sent to the loudspeaker 208 pass through the processor 202 and are exchanged between the processor 202 and a conventional cell phone 216.

The foregoing description is for purposes of illustration only. The true scope of the invention is set forth in the following claims.

What is claimed is:

1. A method of improving speech quality in an audio signal comprising speech and noise, after noise in the audio signal is suppressed, the method comprising:

receiving from a microphone a first audio signal comprising speech as captured by the microphone and noise as captured by the microphone;

providing the first audio signal to a noise suppressor, which is configured to suppress at least some of the noise in the first audio signal and to thereby produce a noise-reduced version of the first audio signal;

using linear predictive coding (LPC) estimation to generate an error signal from the noise-reduced version of the first audio signal, the error signal comprising speech in the first audio signal after at least some of the noise in the first audio signal is removed;

generating linear predictive coding (LPC) coefficients by performing linear predictive coding (LPC) analysis o the first audio signal;

applying the LPC coefficients generated by performing LPC analysis of the first audio signal to the error signal generated by the LPC estimation of the noise-reduced version of the first audio signal to synthesize a second audio signal having a reduced distortion speech; and providing the second audio signal to an audio signal transducer configured to produce audile sound waves from the second audio signal.

2. The method of claim 1, wherein applying the LPC coefficients to the error signal causes the audibility of identifying characteristics of vowels, consonants and other sounds to be increased.

3. The method of claim 1, wherein receiving the first audio signal, occurs in a motor vehicle and wherein providing the second audio signal to the audio signal transducer occurs in the motor vehicle.

4. The method of claim 1, further comprising determining characteristics of the first audio signal before generating LPC coefficients of the first audio signal, wherein determining characteristics of the first audio signal comprises determining speech formants in the first audio signal and generating an LPC representation of the speech formants.

5. The method of claim 1, wherein generating an error signal comprises receiving a time-domain representation of a noise-reduced distorted version of the first audio signal.

6. The method of claim 1, wherein applying the LPC coefficients to the error signal of the first audio signal comprises a convolution of LPC coefficients and the error signal.

7. A method of improving speech quality in an audio signal after suppressing noise in the audio signal, the method comprising:

receiving from a microphone a first audio signal comprising speech as captured by the microphone and noise as captured by the microphone, the first audio signal being represented by frames of digital data;

performing a first partial noise suppression on the first audio signal to provide a partial-noise =reduced version of the first audio signal;

performing a second partial noise suppression on the partial noise-reduced version of the first audio signal to provide a further noise-reduced version of the partial noise-reduced version of the first audio signal;

using linear predictive coding (LPC) estimation to generate an error signal from the further noise-reduced version of the partial noise-reduced version of the first audio signal;

determining linear predictive coding (LPC) coefficients of the partial noise-reduced version of the first audio signal;

applying the LPC coefficients determined from the partially noise-reduced version of the audio signal to the error signal generated by the LPC estimation of the further noise-reduced version of the partial noise-reduced version of the first audio signal to synthesize a speech signal from the first audio signal; and providing the speech signal to an audio signal transducer, which is configured to produce audile sound waves from the time domain audio signal.

8. The method of claim 7, wherein applying the LPC coefficients to the error signal comprises convolution of the LPC coefficients by the error signal.

9. The method of claim 7, wherein receiving a first audio signal and the step of providing the improved-quality speech signal to an audio signal transducer take place in a motor vehicle.

10. An apparatus for improving a quality of speech obtained from a first audio signal having speech as captured by a microphone and noise as captured by the microphone, after noise in the first audio signal is suppressed, the apparatus comprising:

a first noise suppressor, configured to:
suppress at least some of the noise in the first audio signal to thereby produce a noise-reduced version of the first audio signal, the noise-reduced version of the first audio signal comprising distorted speech obtained from the first audio signal;

an error signal generator comprising:
linear predictive code (LPC) estimator configured to generate a linear predictive code (LPC) estimation of the noise-reduced version of the first audio signal, after noise in the first audio signal is at least partially suppressed;

a linear predictive code (LPC) analyzer configured to receive the first audio signal and provide linear predictive code (LPC) coefficients of the first audio signal;

an LPC synthesizer configured to synthesize speech signals by applying the LPC coefficients of the first audio signal to the LPC estimation of the noise-reduced version of the first audio signal; and an audio signal transducer configured to generate audible sound waves from the synthesized speech signals.

11. The apparatus of claim 10, wherein at least one of: the first noise suppressor; the linear predictive code analyzer and the error signal generator comprise a processor.

12. The apparatus of claim 10, further comprising a microphone and a cellular telephone in a motor vehicle, the microphone being operatively coupled to the first noise suppressor and the cellular telephone being operatively coupled to the audio signal transducer, wherein noise in audio signals obtained from the microphone is reduced and speech in the audio signals obtained from the microphone are provided to the cellular telephone.

13. The apparatus of claim 10, wherein the noise suppressor is configured to suppress wind noise, road noise and engine noise.

* * * * *